United States Patent [19]
Ornstein

[11] 3,865,559
[45] Feb. 11, 1975

[54] COMPOSITE THERMOSTAT METAL
[75] Inventor: Jacob L. Ornstein, Norton, Mass.
[73] Assignee: Texas Instruments Incorporated, Dallas, Tex.
[22] Filed: Jan. 30, 1974
[21] Appl. No.: 438,129

[52] U.S. Cl............... 29/195.5, 29/196.1, 29/196.2, 29/196.3, 29/196.6
[51] Int. Cl............................................. B32b 15/18
[58] Field of Search............ 29/195.5, 196.1, 196.2, 29/196.3, 196.6

[56] References Cited
UNITED STATES PATENTS
2,470,753   5/1949   Alban ................................ 29/195.5
3,712,799   1/1973   Ornstein ............................ 29/195.5
3,788,821   1/1974   Ornstein ............................ 29/195.5

Primary Examiner—L. Dewayne Rutledge
Assistant Examiner—E. L. Weise
Attorney, Agent, or Firm—Harold Levine; John A. Haug; James P. McAndrews

[57] ABSTRACT

A composite thermostat metal having high electrical resistivity as required in certain thermostat metal applications is shown to have improved flexivity for increasing the useful work that can be performed with the composite material. The thermostat metal embodies a layer of an iron-chromium-aluminum-cobalt alloy which is sandwiched between and metallurgically bonded to a layer of a manganese-copper-nickel alloy and a layer of an iron-nickel alloy.

3 Claims, 3 Drawing Figures

COMPOSITE THERMOSTAT METAL

Thermostat metals usually have layers of metals of different thermal expansion properties bonded together so that the composite materials are adapted to flex as the metal layers expand to different degrees during temperature changes. This flexing of the thermostat metals is used to perform work in regulating control devices in response to such temperature changes. Where electrical current is directed through the thermostat metals for self-heating the metals to a degree proportional to the current, the thermostat metals are also used to perform control functions in response to current variations.

In each composite thermostat metal known in the art, the composite metal structure embodies layer materials which are cooperatively related to each other with respect to the coefficients of thermal expansion of the different layer materials. The layer materials are also selected with respect to the modulus of elasticity of the layer materials, the bondability and chemical compatibility of the layer materials, the capability of the layer materials to withstand elevated temperatures, and, in many cases, the electrical resistivity of the layer materials. Where thermostat metals previously known have been provided with very high electrical resistivity, as required in certain control devices for enhancing electrical self-heating of the composite materials, it is found that the thermostat metal structures which have achieved the desired degree of electrical resistivity have also been characterized by less flexivity than would be desired. This limited flexivity restricts the useful work that can be performed with these thermostat metals. These high resistivity structures have also been difficult to manufacture with precisely predetermined thermal response properties.

It is an object of this invention, to provide novel and improved thermostat metals having high electrical resistivity; to provide such composite thermostat metals having improved flexivity; to provide such thermostat metals which are easily manufactured with precisely predetermined thermal response properties; and to provide such thermostat metals which are of stable and economical construction.

Other objects and advantages and details of the composite thermostat metal of this invention appears in the following detailed description of preferred embodiments of the invention, the detailed description referring to the drawings in which.

Figure 1:
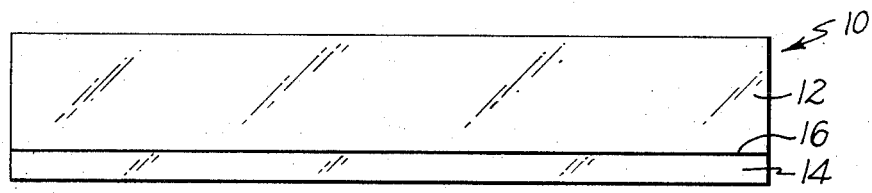
FIG. 1 is a side elevation view of a high resistivity thermostat metal known in the art.

Referring to the drawing, 10 in FIG. 1 illustrates the composite thermostat metal known in the art which is commonly used in control devices where the composite material requires very high electrical resistivity for enhancing electrical self-heating of the composite material. As shown, this composite material includes one outer metal layer 12 of a manganese-copper-nickel alloy having a nominal composition, by weight, of about 72 percent manganese, 18 percent copper, and 10 percent nickel. This material is characterized by a very high electrical resistivity and by a very high coefficient of thermal expansion. The thermostat metal 10 also includes an opposite outer metal layer 14 of an iron-nickel alloy having a nominal composition, by weight, of about 36 percent nickel and 64 percent iron. This material has a very low coefficient of thermal expansion but has a relatively much lower electrical resistivity. The metal layers 12 and 14 are metallurgically bonded to each other substantially throughout the interface 16 between the layers in well known manner.

In this known thermostat metal, the metal layers have adequate bondability, chemical compatibility and ability to withstand elevated temperatures. The metal layers 12 and 14 also function as electrical resistances arranged in parallel so that, where the metal layer 12 of high resistivity material is made relatively thick, the effective electrical resistivity of the composite material is quite high. For example, where the metal layer 12 comprises about 80 percent of the total thickness of the composite material 10, the thermostat metal has an effective electrical resistivity of about 850 ohms/circular mil-foot. In this construction, however, the thermostat metal 10 achieves only a somewhat limited flexivity in the range from about $147 \times 10^{-7}$ to about $150 \times 10^{-7}$ in the temperature range from 50°F. to 200°F. The term "flexivity" as used herein relates to the useful work that the thermostat metal is adapted to perform during flexing in response to temperature change and is determined in well known manner in accordance with the procedure established by the American Society for Testing Materials. Further, because layer 12 is made so much thicker than the metal layer 14 in order to achieve the desired level of resistivity, the thermostat metal 10 is difficult to manufacture with precisely predetermined thermal response properties. That is, small variations in layer thickness tend to occur during manufacture of the composite material and the resulting variation in the ratio of layer thicknesses can cause significant changes in the flexivity properties of the thermostat metal.

Figure 2:
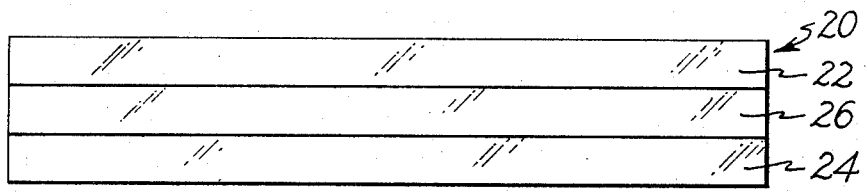
FIG. 2 is a side elevation view of the novel and improved thermostat metal of this invention.

In the novel composite thermostat metal 20 of this invention as illustrated in FIG. 2, however, significantly improved high resistivity properties are achieved. That is, the thermostat metal 20 achieves correspondingly high or higher effective electrical resistivities than have been previously achieved in the art while also achieving relatively higher thermostat metal flexivity. The structure of the thermostat metal 20 is also more easily manufactured with more precisely predetermined thermostat metal properties.

In this improved thermostat metal 20, one outer metal layer 22 is formed of a manganese-copper-nickel alloy having a nominal composition, by weight, in the range from about 71 to 76 percent manganese, 9 to 19 percent copper, and 9 to 17 percent nickel. Preferably, for example, the layer 22 is formed of an alloy of about 72 percent manganese, 18 percent copper, and 10 percent nickel, this alloy being characterized by a very high coefficient of thermal expansion of about $14.8 \times 10^{-6}$ in./in./°F. in the temperature range from 50°F. to 200°F., by a high electrical resistivity of about 1019 ohms/circular milfoot in this temperature range, and by a modulus of elasticity of about 18,000,000 psi. in this temperature range. The improved thermostat metal 20 also includes an opposite outer metal layer 24 of an iron-nickel alloy having a nominal composition, by weight, of about 35.5 to 36.5 percent nickel and about 63.5 to 64.5 percent iron. Preferably, for example, the layer 24 is formed of an alloy of about 36 percent nickel and 64 percent iron, this alloy having a very low coefficient of thermal expansion of about $0.7 \times 10^{-6}$ in./in./°F. in the temperature range from 50°F. to 200°F., and having an electrical resistivity of about 484 ohms/circular mil-foot and a modulus of elasticity of about 21,400,000 psi, in this temperature range. In accordance with this invention, the improved thermostat metal 20 also includes an intermediate metal layer 26 of an iron-chromium-aluminum-cobalt alloy having a nominal composition, by weight, of 71.5 percent iron, about 22.0 percent chromium, about 5.75 percent aluminum, and about 0.5 percent cobalt, this alloy having a coefficient of thermal expansion of about $7.0 \times 10^{-6}$ in./in./°F. in the temperature range from 50°F. to 200°F., having an electrical resistivity of about 872 ohms/circular mil-foot in this temperature range, and having a modulus of elasticity of 29,000,000 psi in this temperature range.

In accordance with this invention, the metal layers 22, 24 and 26 have selected thicknesses in the range from about 40 to 74 percent, from about 10 to 17 percent and from about 10 to 45 percent respectively of the total thickness of the composite thermostat metal 20 for cooperating in providing the composite material with an effective electrical resistivity of at least about 850 ohms/circular mil-foot and a flexivity of $150 \times 10^{-7}$ or more in a structure having a more easily manufactured and controlled ratio of outer layer thicknesses.

Typically, for example, the thermostat metal 20 has a metal layer 22 formed of an alloy having a nominal composition, by weight, of 72 percent manganese, 18 percent copper and 10 percent nickel, the layer 22 having a thickness comprising 61.5 percent of the total thickness of the composite material 20. The composite material also has an opposite outer layer 24 of an alloy having a nominal composition, by weight, of 36 percent nickel and 64 percent iron, this layer 24 having a thickness comprising about 17 percent of the total composite material thickness. The composite material 20 also has an intermediate metal layer 26 of an alloy having a nominal composition, by weight, of 71.5 percent iron, 22 percent chromium, 5.75 percent aluminum and 0.5 percent cobalt, this metal layer 26 having a thickness comprising about 21.5 percent of the total composite material thickness. In this composite structure, the metal layers 22, 24 and 26 have adequate bondability and chemical compatibility relative to each other and the composite structure has layer thickness ratios that are adequately controlled during manufacture in conventional manner. However, the composite material 20 has an effective electrical resistivity of about 862 ohms/circular mil-foot and has a flexivity of about $169 \times 10^{-7}$, a desirable combination of resistivity and flexivity properties not previously achieved in the thermostat metal art. The composite material 20 also has the ability to withstand exposure to elevated temperatures.

Figure 3:
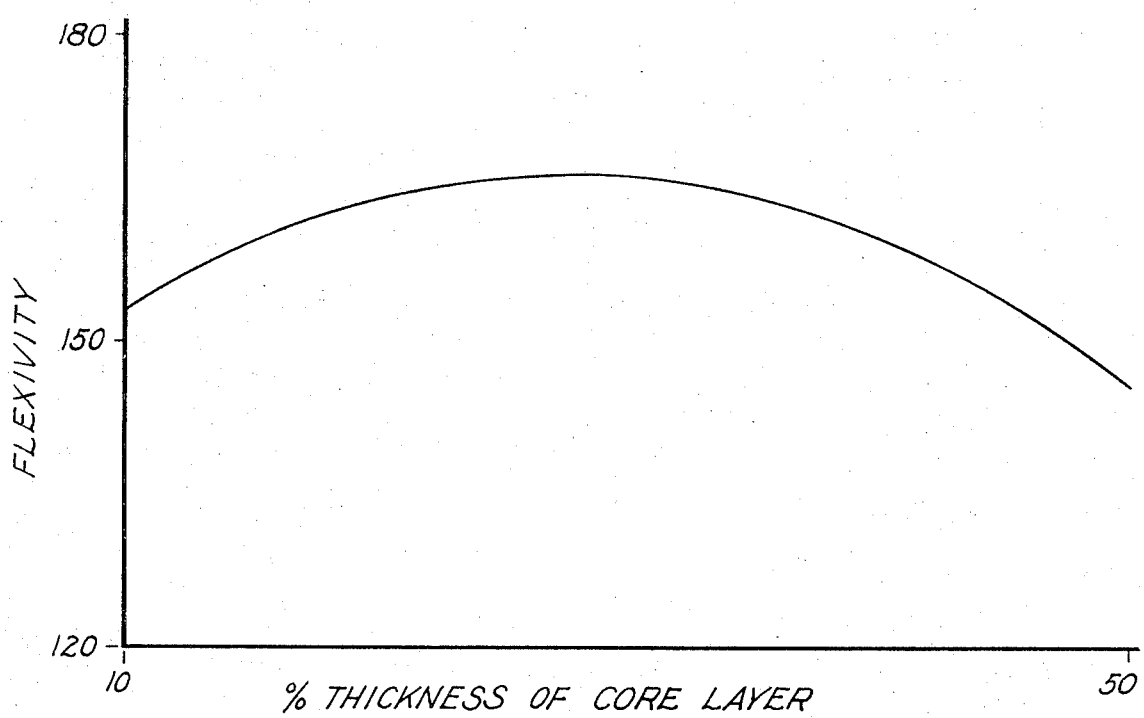
FIG. 3 is a graph illustrating properties of the thermostat metal of FIG. 2.

Alternately, as illustrated by the curve 32 in FIG. 3, the relative thickness of the metal layer 26 is adapted to be varied between 10 percent and 45 percent of the total thickness of the composite material 20 while the relative thicknesses of the metal layers 22 and 24 are appropriately varied within the ranges above specified for maintaining the effective resistivity of the composite metal 20 at about 850 ohms/circular mil-foot while varying the flexivity of the composite material in the range from about $150 \times 10^{-7}$ to about $170 \times 10^{-7}$.

Alternately, where the relative thickness of the metal layer 26 is varied between 10 and 45 percent of the total thickness of the composite material 20 while the relative thicknesses of the metal layers 22 and 24 are appropriately varied within the range above specified for maintaining the flexivity of the composite material at about $150 \times 10^{-7}$, the resistivity of the composite material is readily varied between about 850 and 869 ohms/circular mil-foot.

Suitable combinations of layer thicknesses (expressed as percentage of total composite thickness) providing composite materials having effective resistivities of at least 850 ohms/circular mil-foot and flexivities of at least about $150 \times 10^{-7}$ include the following:

| Layer 22 | Layer 26 | Layer 24 |
| --- | --- | --- |
| 74 | 10 | 16 |
| 70 | 15 | 15 |
| 65 | 20 | 15 |
| 61 | 25 | 14 |
| 56 | 30 | 14 |
| 48 | 40 | 12 |
| 44 | 45 | 11 |

In this way, the thermostat metals of this invention are provided with suitable flexivity and with significantly higher effective resistivities than have been previously known in the art. Similarly, the thermostat metals of this invention are provided with suitably high effective electrical resistivity and with significantly higher flexivities than have been known in the art. In the same way, by use of selected layer thicknesses, the thermostat metals of this invention are provided with suitable flexivity and with suitably high effective electrical resistivity on a structure having a significantly smaller ratio of thickness between the metal layers 22 and 24 so that the thermostat metals are easily manufactured with more precisely predetermined thermal response properties.

It should be understood that although particular embodiments of the thermostat metal of this invention have been described by way of illustrating the invention, this invention includes all modifications and equivalents of the disclosed embodiments falling within the scope of the appended claims.

I claim:

1. A composite thermostat metal comprising a first outer layer of a metal of relatively high coefficient of thermal expansion having a nominal composition, by weight, of from about 71 to 76 percent manganese, from about 9 to 19 percent copper, and from about 9 to 17 percent nickel, an opposite outer layer of a metal of relatively low coefficient of thermal expansion having a nominal composition, by weight, of from about 35.5 to 36.5 percent nickel and from about 63.5 to 64.5 percent iron, and an intermediate layer of a metal having a nominal composition, by weight, of about 61.5 percent iron, about 22.0 percent chromium, about 5.75 percent aluminum, and about 0.5 percent cobalt, said intermediate metal layer being sandwiched between and metallurgically bonded to said first and opposite outer metal layers.

2. A composite thermostat metal as set forth in claim 1 wherein said first outer metal layer is of a metal alloy having a nominal composition, by weight, of about 72 percent manganese, 18 percent copper and 10 percent nickel, said opposite outer metal layer is of a metal alloy having a nominal composition, by weight, of about 36 percent nickel and 64 percent iron, and said intermediate metal layer is of an alloy having a nominal composition, by weight, of about 61.5 percent iron, 22 percent chromium, 5.75 percent aluminum and 0.5 percent cobalt, said first metal layer having a thickness comprising from about 40 to 74 percent of the total thickness of said composite material, said opposite outer metal layer having a thickness comprising from about 10 to 17 percent of the total thickness of said composite material, and said intermediate metal layer having a selected thickness in the range from about 10 to 45 percent of the total composite material thickness providing said composite material with an effective electrical resistivity of at least about 850 ohms/circular mil-foot and a flexivity of at least about $150 \times 10^{-7}$.

3. A composite thermostat metal as set forth in claim 2 wherein said first, opposite and intermediate metal layers have thicknesses comprising about 61.5 percent, 17 percent and 21.5 percent respectively of the total composite material thickness.

* * * * *